United States Patent Office 2,883,975
Patented Apr. 28, 1959

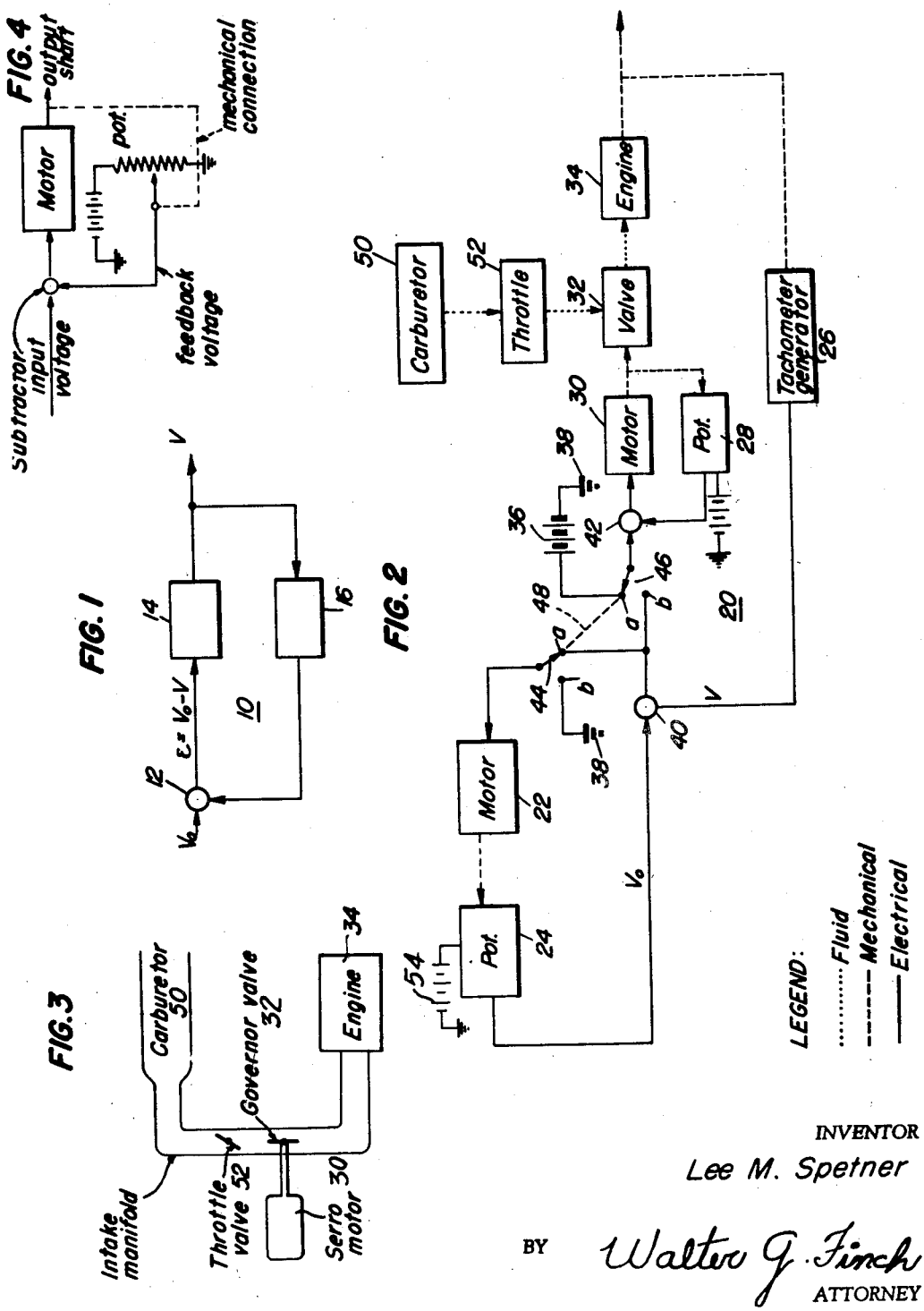

2,883,975
AUTOMATIC SPEED GOVERNOR

Lee M. Spetner, Washington, D.C.

Application October 23, 1957, Serial No. 691,903

6 Claims. (Cl. 123—102)

This invention relates generally to speed control devices, and more particularly it pertains to an adjustable, automatic speed governor system for controlling the speed of an automotive vehicle or the like.

From many points of view, it is desirable to have an automatic speed limiter or governor system in an automobile so that the driver may free himself from watching the speedometer and feel confident that he is obeying the speed laws of the area in which he is driving. Since legal speed limits vary from one locality to another, it is desirable to have the maximum speed of the governor system adjustable in a quick and convenient manner.

In addition to the above, excessive automobile speed is considered by many authorities to be a major cause of highway accidents. Such excessive speed is due more often to negligence on the part of the driver than to premeditation on his part.

Since it is difficult for many drivers to judge their speed accurately without observing the speedometer of the automobile, there is an urgent and long felt need for an automatic governor device to set an upper limit on the speed of the automobile, so that the driver may be relieved of the concern that he is exceeding the speed limit. By means of such a device, therefore, it will not be necessary for the driver to divide his attention between the highway and the speedometer of the automobile.

Such an automatic governor system should have two important properties, aside from accurately limiting the speed. First, the speed limit should be conveniently and quickly adjustable on the automatic device by the driver so as to conform to the various speed limits posted on the different types of highways, and, secondly, the speed limit on the device should be capable of being easily over-ridden in case of an emergency, such as caused by passing of other automobiles on the highway when another automobile approaches unexpectedly in the opposite direction.

It is one of the objects of this invention, therefore, to provide an adjustable, automatic speed governor or limiter system for an automobile or vehicle in which the maximum speed limit thereon is adjustable in a quick and convenient manner.

Still another object of this invention is to provide an adjustable, automatic speed governor system having a speed limit which is capable of being easily over-ridden in the case of an emergency, such as an approaching collision with another automobile.

To provide an adjustable automatic speed governor system which is economical to manufacture, which is easy to install and maintain, and which is efficient and reliable in operation, are other objects of this invention.

These and other objects and advantages of this invention will become more readily apparent from the following detailed description when considered in connection with the single accompanying drawing in which:

Fig. 1 is a schematic block diagram of an ordinary speed regulator system for an automobile wherein the maximum speed is fixed;

Fig. 2 is a schematic diagram of an adjustable automobile speed governor or limiter arrangement for automotive vehicles comprising this invention;

Fig. 3 is a schematic showing the mechanical relationship of the automobile engine, throttle valve, intake manifold, carburetor, servo motor, and governor valve; and Fig. 4 is a schematic of a position-feedback servo utilizing a potentiometer feedback to a D.C. motor.

Referring now to Fig. 1 of the drawing, there is illustrated an ordinary speed regulator wherein the maximum speed as represented by the voltage $V_0$ is fixed, with the throttle being wide open, for sake of simplicity of explanation. The output of the engine of the automobile and its associated controls, which are represented by the reference numeral 14, is the speed V.

A feedback loop 16, as illustrated in Fig. 1, is located between the output of the engine 14 and a resistance summing network or subtractor 12 is provided and operated in such a manner so that the output voltage V, representative of the speed of the engine, is driven so that the difference between the input voltage $V_0$ of the speed regulator 12 and the output voltage V of the engine is zero, that is, $E=V_0-V=0$.

Thus, in a steady state condition, voltages V and $V_0$ are equal if the input voltage $V_0$ of the speed regulator is not greater than the maximum possible output voltage of the engine 14. This would be determined by the position of the throttle of the engine. Hence, it can be seen that in a steady state condition, the position of the throttle can control the output voltage V of the engine 14 to lie anywhere in the region $0 \leq V \leq V_0$. This explanation, to reiterate, applies to a fixed input voltage $V_0$ of the speed regulator, and is presented only as an example of a conventional type of such a device.

However, it is possible to render the input voltage $V_0$ of the speed regulator adjustable to any desired voltage representative of the speed of which the engine 14 of the automobile is capable. This is achieved by the arrangement shown in Fig. 2, which includes the feed-back loop 16 of Fig. 1, an example of this feed-back loop being shown in more detail, with an additional position-feedback loop in the upper left hand portion for setting the voltage $V_0$ of the speed regulator arbitrarily.

The speed governor or limiter arrangement shown in Fig. 2, is essentially a D.C. electrical system although other systems could be chosen to operate according to the same basic principle of this invention.

As shown in Figs. 2 and 3, a conventional D.C. servo motor 30 of the desired type is utilized to operate a butterfly type valve or governor valve 32 located in the intake manifold of the engine 34 of the automobile, which is in series with the ordinary throttle valve so that when the electrically operated valve is wide open, the engine operates as if it were not there. If the throttle valve is less than wide open, then an upper limit is established to the rate of flow of the fuel-air mixture into the cylinders of the engine 34.

A feedback potentiometer 28 is connected to the shaft of the motor 30 controlling the valve 32, and is energized in a conventional manner to supply a position feedback voltage to a resistance summing junction or subtractor 42, the latter thus subtracting the output voltage of the potentiometer 28 from the input voltage to motor 30. A tachometer generator 26 having an output voltage proportional to speed is mechanically and electrically coupled to the engine output shaft and supplies its output to a second resistance summing network or subtractor 40.

A battery 36, one side of which is grounded at 38, has its other side connected to point $a$ of a switch 46, and thence to the resistance summing network 42. This battery 36 is preferably of twelve volts, D.C.

When the two ganged switches 44 and 46, connected by gang member 48, are in the positions *a* shown in Fig. 2, the left-hand input to the subtractor 42 is constituted by the full voltage of battery 36 and as a consequence the motor 30 opens its valve 32 to its limit, and hence the engine 34 can be run at any speed up to its absolute maximum.

A D.C. motor, of the type used in the present invention, operates such that the angular velocity of the output shaft is proportioned to the input voltage. In the present invention, a device is needed which operates such that the angular position (angular position is measured from a suitable zero reference which in the present invention corresponds to valve 32 being closed) of the output shaft is proportional to the input D.C. voltage. A position-feedback servo is utilized to operate valve 32 from the input off the arm of switch 46.

It is conventional practice to construct a position-feedback servo by utilizing a potentiometer feedback to a D.C. motor. This is schematically illustrated in Fig. 4, which shows that the potentiometer arm is rigidly connected to the output shaft of the motor. Thus, it is evident that one can arrange to have the feedbcak voltage, which comes from the arm of the potentiometer, to be proportioned to the angular position of the output shaft. By suitable choice of battery voltage, a common scale factor (in degrees of shaft rotation per voltage of input) can be arranged for both the input and feedback voltages. Thus, when the shaft comes to the position called for by the input voltage, the feedback voltage will equal the input voltage and the input to the motor will become zero, bringing the motor to a stop at the proper position.

In the position of the ganged switches 44, 46, of Fig. 2, the voltage V, which is a measure through the tachometer generator 26 of the engine shaft speed, plays the role of a reference input voltage to the position-feedback loop in the upper left portion of the diagram.

This position-feedback loop includes a D.C. servo motor 22, of the appropriate type, and a potentiometer 24 connected to a source of current 54, mechanically connected to the motor 22 and energized in a conventional manner. The input to motor 22 is connected to a second resistance summing network or subtractor 40 with the switch 44 in position *a* and is connected to ground 38 when the switch 44 is in position *b*.

The steady state operation of the position-feedback loop is to drive $E=V_0-V$ to zero by adjusting the voltage $V_0$ of potentiometer 24 to equal the voltage V of tachometer generator 26.

After the position-feedback loop has settled to a steady state, let it be assumed that the two ganged switches 44 and 46, through their ganging element, are moved to the positions *b*. This grounds the input voltage to D.C. servo motor 22, thus assuring that it will not change its position, and fixes the value of the voltage $V_0$. At the same time, the loop in the lower right portion of the diagram is closed. In this instance, the voltage $V_0$ plays the role of calling for a fixed governed speed and the lower right loop of the system is now an ordinary governor loop which insures that V, representing the vehicle speed, is equal to or less than $V_0$, the voltage representing a fixed governed speed. With the ordinary throttle of the engine 34 open wide, the condition $V=V_0$ can be achieved. Otherwise, the condition $V<V_0$ will always occur.

The stability and settling time of the upper left hand position-feedback loop will now be considered. Let the combination motor-potentiometer (22—24) characteristic be such that the voltage $V_0$ changes at the steady rate of $k$ volts per second for each volt input to the D.C. servo motor 22. That is, the speed of motor 22 is proportional to the input voltage, $E_t$, thereto. The output of potentiometer 24 will depend upon the distance motor 22 runs before the input $E_t$ is reduced to zero. Then, clearly $$V_0(t) = k \int_0^t E(t)dt \qquad \text{Eq. (1)}$$

On replacing E by $V_0-V$, there is obtained $$V_0(t) = k \int_0^t [V_0(t) - V]dt \qquad \text{Eq. (2)}$$

or $$\frac{dV_0}{dt} = k(V_0 - V) \qquad \text{Eq. (3)}$$

or $$\frac{dV_0}{dt} - kV_0 = -kV \qquad \text{Eq. (4)}$$

The solution of this Equation 4 is:

$$V_0(t) = [V_0(0) - V]e^{kt} + V \qquad \text{Eq. (5)}$$

Certainly, for stability of the position-feedback loop in the upper left hand portion of the system, it is required that $k<0$. That is, that the motion of the motor be in such a direction as to reduce the input thereto. This is easily arranged by properly connecting the input to the motor leads. Furthermore, the larger $|k|$ is, the faster the position-feedback loop will settle. If one second is arbitrarily chosen as a good figure for the settling time, then $$\frac{10}{-k} = 1$$

where the settling time has been chosen as ten time constants. Thus $k$ is equal to minus ten (10) volts per second per volt and is not considered to be an unreasonable number.

In actual operation of the governor arrangement, let it be assumed, for example, that the driver of the automobile wishes to set the governing speed to 50 miles per hour and that one (1) volt equals 10 miles per hour. The driver first moves the ganged switches 44 and 46, through their ganging element 48, to positions *a* if they are not already there. The voltage from battery 36 then causes motor 30 to open valve 32 fully. This allows the driver to drive the car at any speed of which the engine 34 is capable. By observing the speedometer of the automobile, the driver then brings the speed of the automobile to 50 miles per hour, which makes the voltage of tachometer generator 26, $V=5$ volts, and waits for the upper left hand position-feedback loop to settle so that voltage $V_0$ also becomes 5 volts. Then, the driver moves the switches 44 and 46 to positions *b*.

With the input to motor 22 grounded at 38, the voltage $V_0$ remains at 5 volts as long as the switches remain in positions *b*. The lower right loop now operates as an ordinary governor with a maximum speed of 50 mile per hour.

Thus, a speed governor is provided whose maximum speed is quickly, conveniently, and accurately adjustable, since all the driver needs to do to set any speed limit is to start with the switches 44 and 46 in positions *a*, then bring the automobile up to the desired maximum speed and then move the switches 44 and 46 to positions *b*. These double throw, ganged switches 44 and 46, with gang element 48, could conveniently be similar to the foot-operated bright-dim headlights switch of the automobile. It is obvious that this feature, therefore, satisfies the requirement that the speed limit should be conveniently and quickly adjustable.

In addition to the above, in case of emergency, easy overriding of the speed limit set can be obtained by a mechanical or electro-magnetic linkage between the switches 44 and 46 and the accelerator pedal of the automobile, such that when the accelerator pedal is pushed to the floor, the switches 44 and 46 are moved to positions *a* if they are not already in these positions. For even faster emergency response, the override might be directly connected to valve 32.

Obviously many modifications and variations of the present invention are possible in the light of the above teachings. It is, therefore, to be understood that within the scope of the appended claims the invention may be practiced otherwise than as specifically described.

What is claimed is:

1. A governor for limiting the output of a prime mover to a predetermined readily adjustable level, comprising, throttling means controlling the input to said prime mover, means limiting the action of said throttling means, a first servomotor for controlling said limiting means, a feedback member providing an analogue of the output of said prime mover, a second servomotor for following the analogue output of said feedback member and providing an output equivalent to the output of said feedback member, with said output being maintained at this value regardless of subsequent changes in the output of said feedback member, and two position switching means for controlling the inputs to said first and second servomotors, the first position of said switch applying the difference between said feedback member and the output of said second servomotor to the input of said second servomotor and the second position of said switching means applying the difference between the output of said feedback means and the output of said second servomotor to the input of said first servomotor.

2. An arrangement as recited in claim 1, wherein said means for limiting the action of said throttling means includes a butterfly type valve located in the intake manifold of said prime mover.

3. An arrangement as recited in claim 1, wherein said first servomotor comprises a D.C. servomotor.

4. An arrangement as recited in claim 3, wherein said second servomotor comprises a D.C. servomotor.

5. An arrangement as recited in claim 4 wherein said feedback member comprises a potentiometer.

6. An arrangement as recited in claim 5, wherein said two position switching means comprises two ganged switches.

References Cited in the file of this patent

UNITED STATES PATENTS

| | | |
|---|---|---|
| 2,174,972 | Dach | Oct. 3, 1939 |
| 2,352,119 | Putt | June 20, 1944 |
| 2,469,779 | Nowalk | May 10, 1949 |